(No Model.)

7 Sheets—Sheet 1.

E. CRAWLEY.
MACHINE FOR ROUNDING AND BACKING BOOKS.

No. 372,128. Patented Oct. 25, 1887.

Attest.
O. M. Hill
Jno. B. Strehli

Inventor.
Edwin Crawley
per Wm. Hubbell Fisher,
Atty (No Model.) 7 Sheets—Sheet 2.

E. CRAWLEY.
MACHINE FOR ROUNDING AND BACKING BOOKS.

No. 372,128. Patented Oct. 25, 1887.

Attest.
O. M. Hill
Jno. W. Freble

Inventor.
Edwin Crawley
per Wm. Hubbell Fisher, Atty.

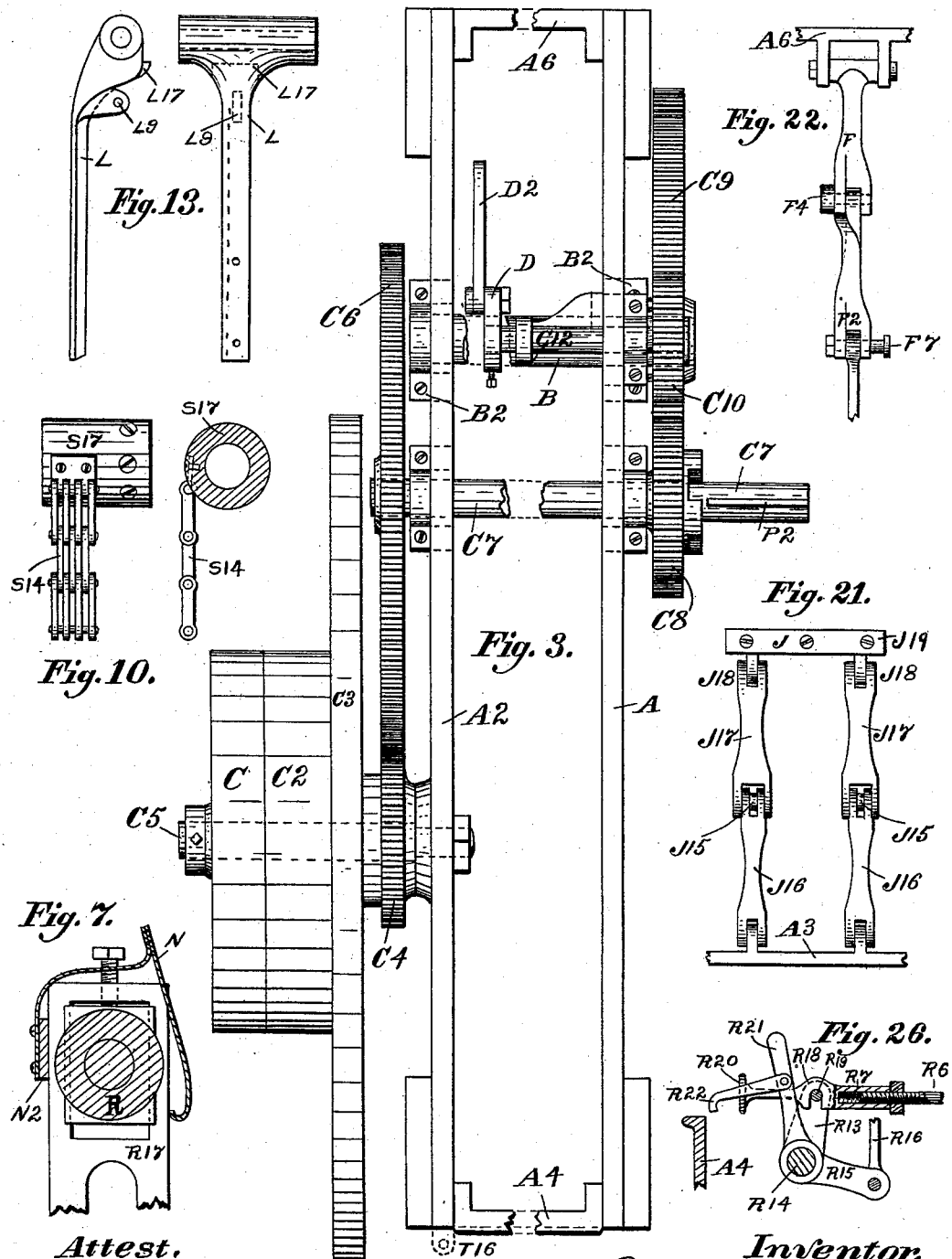

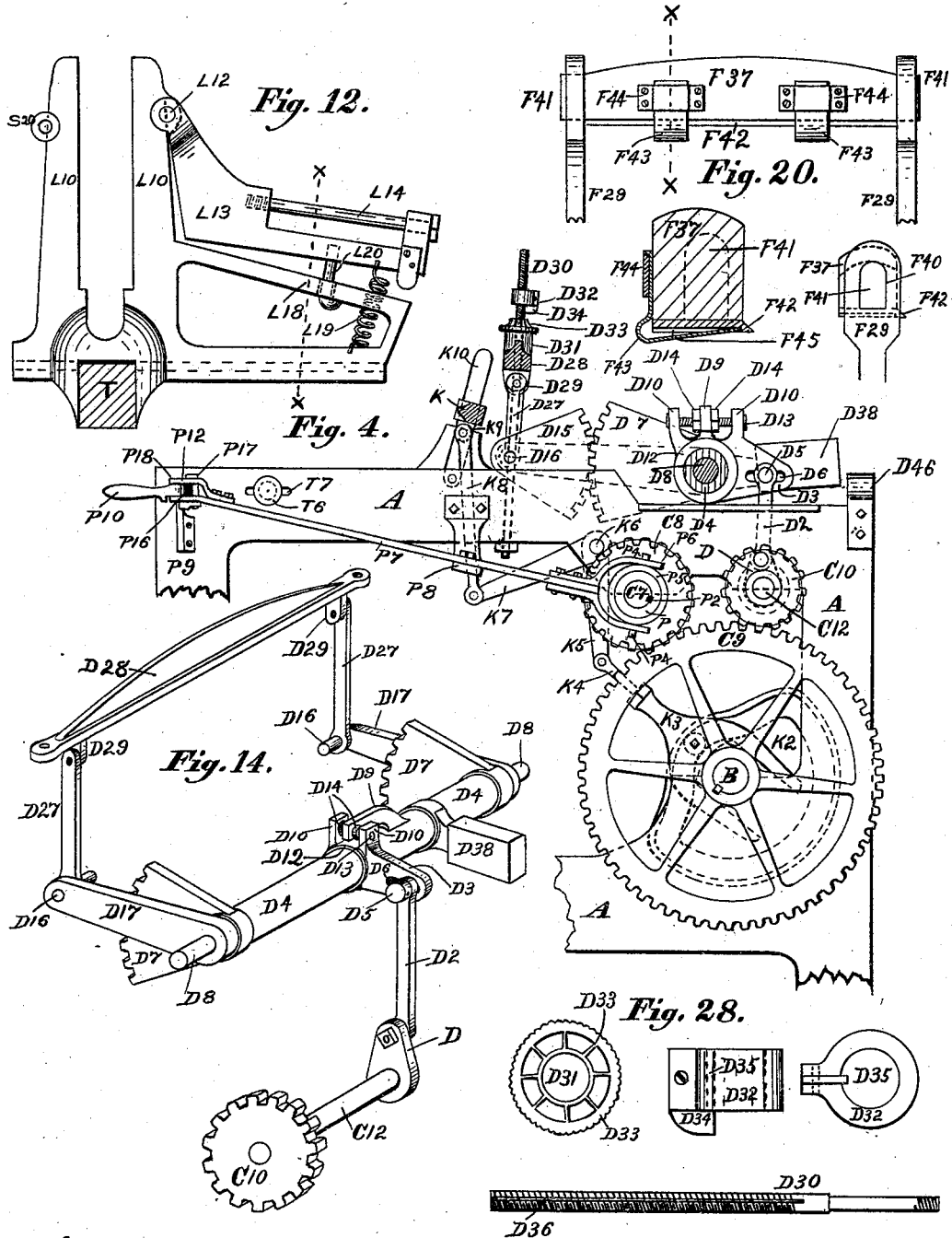

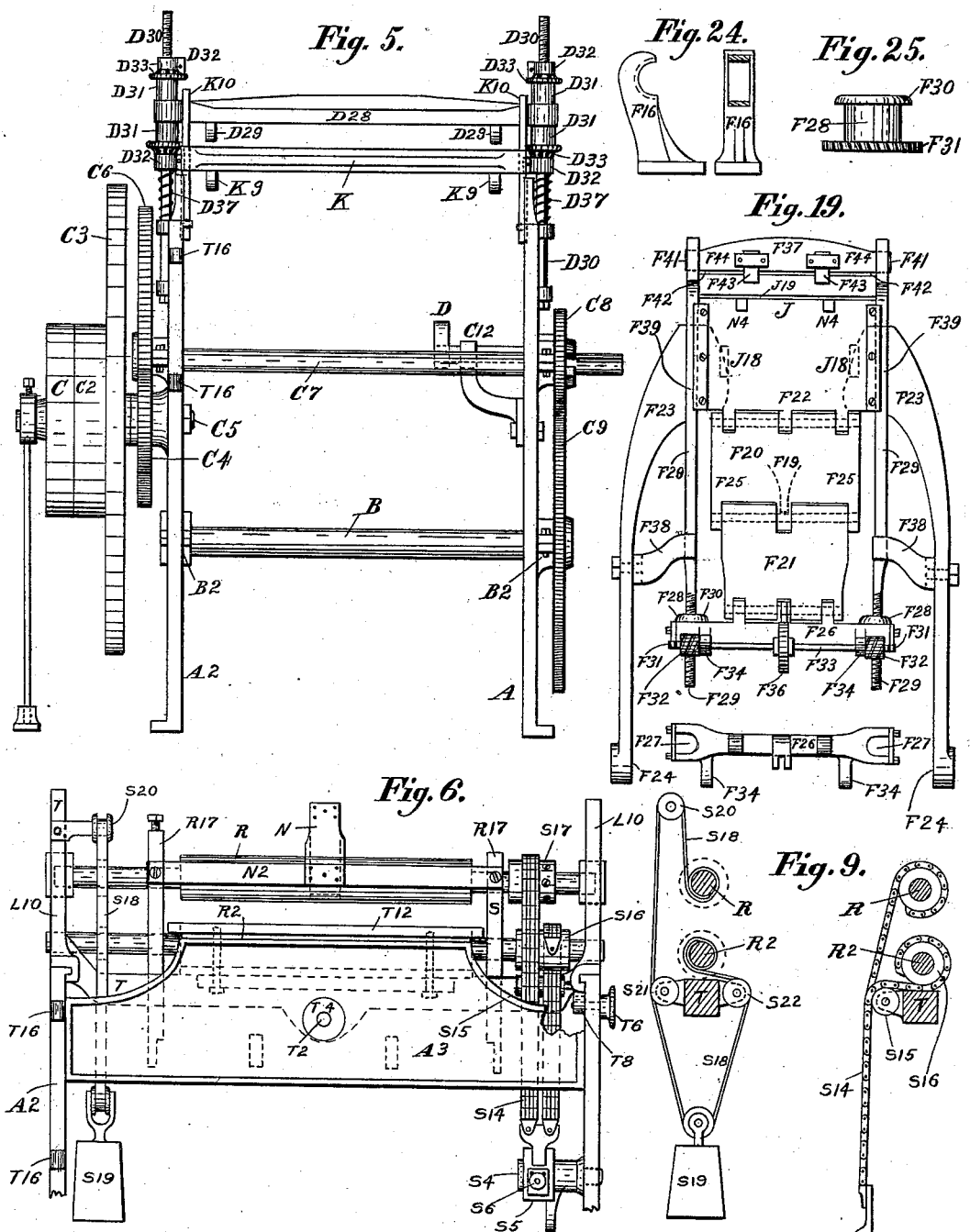

(No Model.) 7 Sheets—Sheet 6.
E. CRAWLEY.
MACHINE FOR ROUNDING AND BACKING BOOKS.
No. 372,128. Patented Oct. 25, 1887.
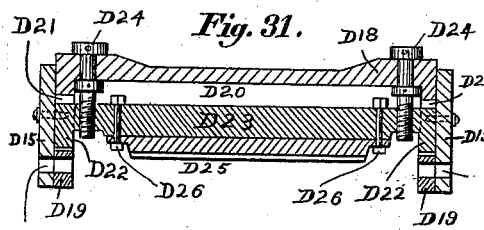
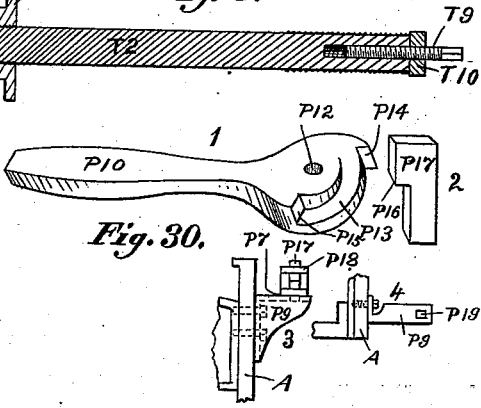
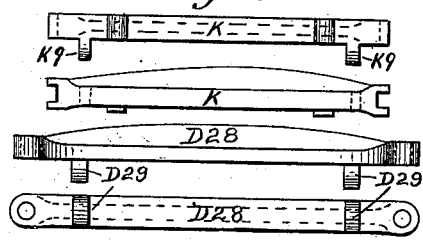
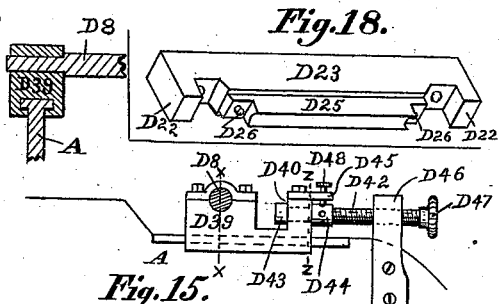
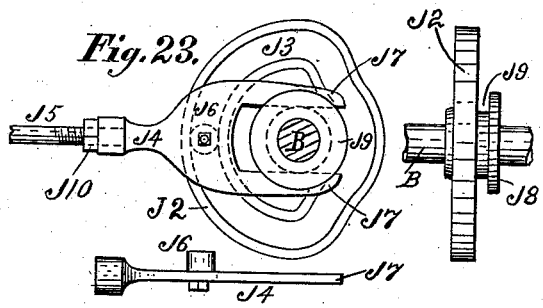
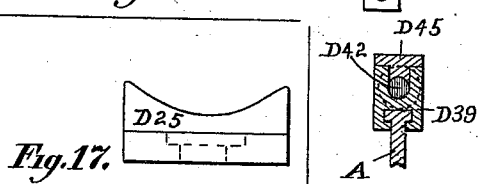
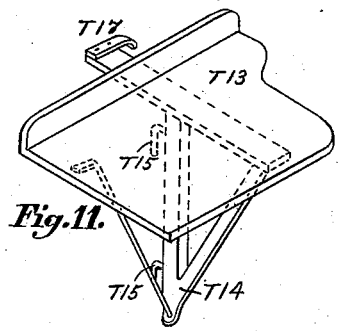
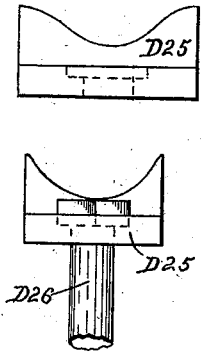
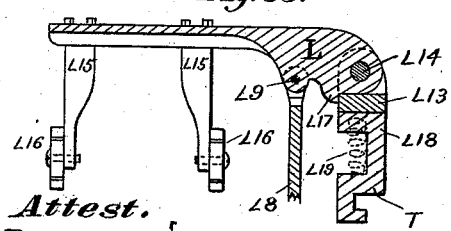
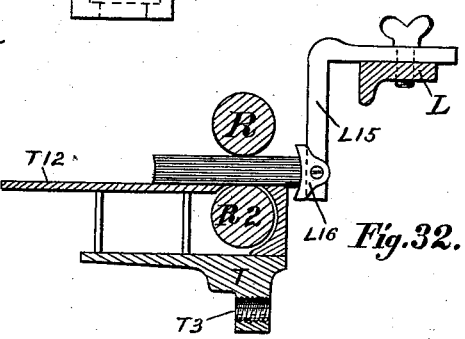
Attest.
O. M. Hill
Jno. B. Froehlix
Inventor.
Edwin Crawley
per Wm. Hubbell Fisher, Atty.

(No Model.) 7 Sheets—Sheet 7.
E. CRAWLEY.
MACHINE FOR ROUNDING AND BACKING BOOKS.
No. 372,128. Patented Oct. 25, 1887.
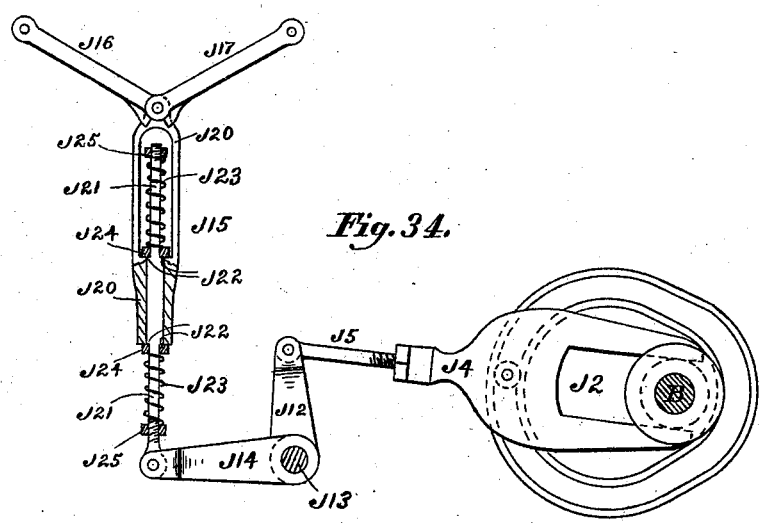
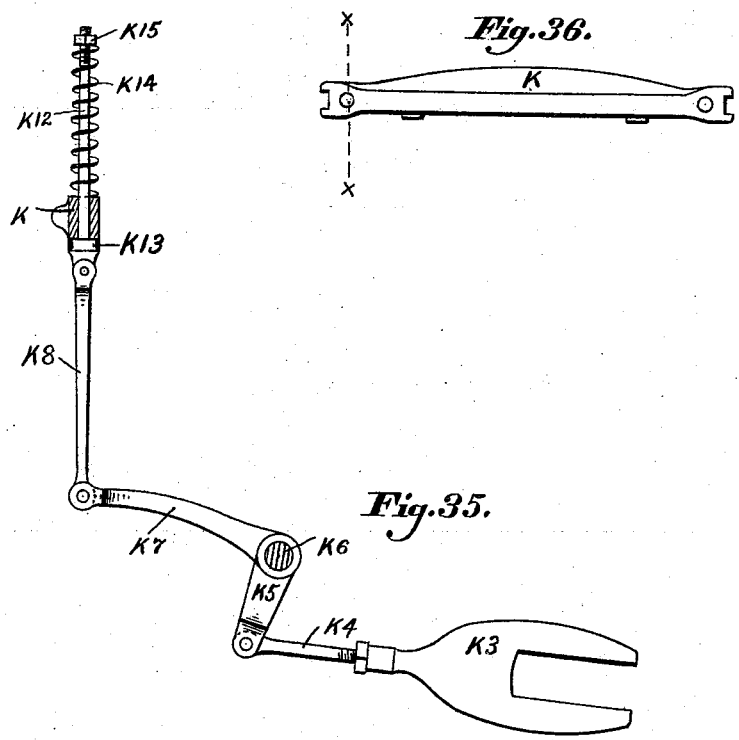
Attest.
O. M. Hill
Jno. W. Strehli
Inventor.
Edwin Crawley
per Wm. Hubbell Fisher
Atty.

UNITED STATES PATENT OFFICE.

EDWIN CRAWLEY, OF NEWPORT, KENTUCKY.

MACHINE FOR ROUNDING AND BACKING BOOKS.

SPECIFICATION forming part of Letters Patent No. 372,128, dated October 25, 1887.

Application filed March 7, 1885. Serial No. 158,038. (No model.)

*To all whom it may concern:*

Be it known that I, EDWIN CRAWLEY, a citizen of the United States, and a resident of the city of Newport, in the county of Campbell and State of Kentucky, have invented certain new and useful Improvements in Machines for Rounding and Backing Books, of which the following is a specification.

My invention relates to improvements in that class of machines wherein both the operations of rounding and backing the book are carried on in the same machine.

Chief among the various improvements constituting the several principal features of my invention are, first, improved mechanism for enabling the movable jaws to pinch or grasp the book; secondly, improved mechanism for supplementing the mechanism just mentioned under said first heading in tightly pinching or grasping said book; thirdly, improved mechanism for enabling the movable jaws to hold the book stationary and firmly in position while the book is being backed, the object of these improvements being to relieve (as hereinafter set forth) certain operative parts of the machine from undue strain and consequent wear and tear; fourthly, an improved clutch whereby the operation of the machine can be quickly checked, and thereby in case of accident prevent injuring the mechanism, and also the book.

The several other features of my invention and the advantages arising from their use, conjointly or otherwise, will be fully hereinafter set forth.

Figure 1:
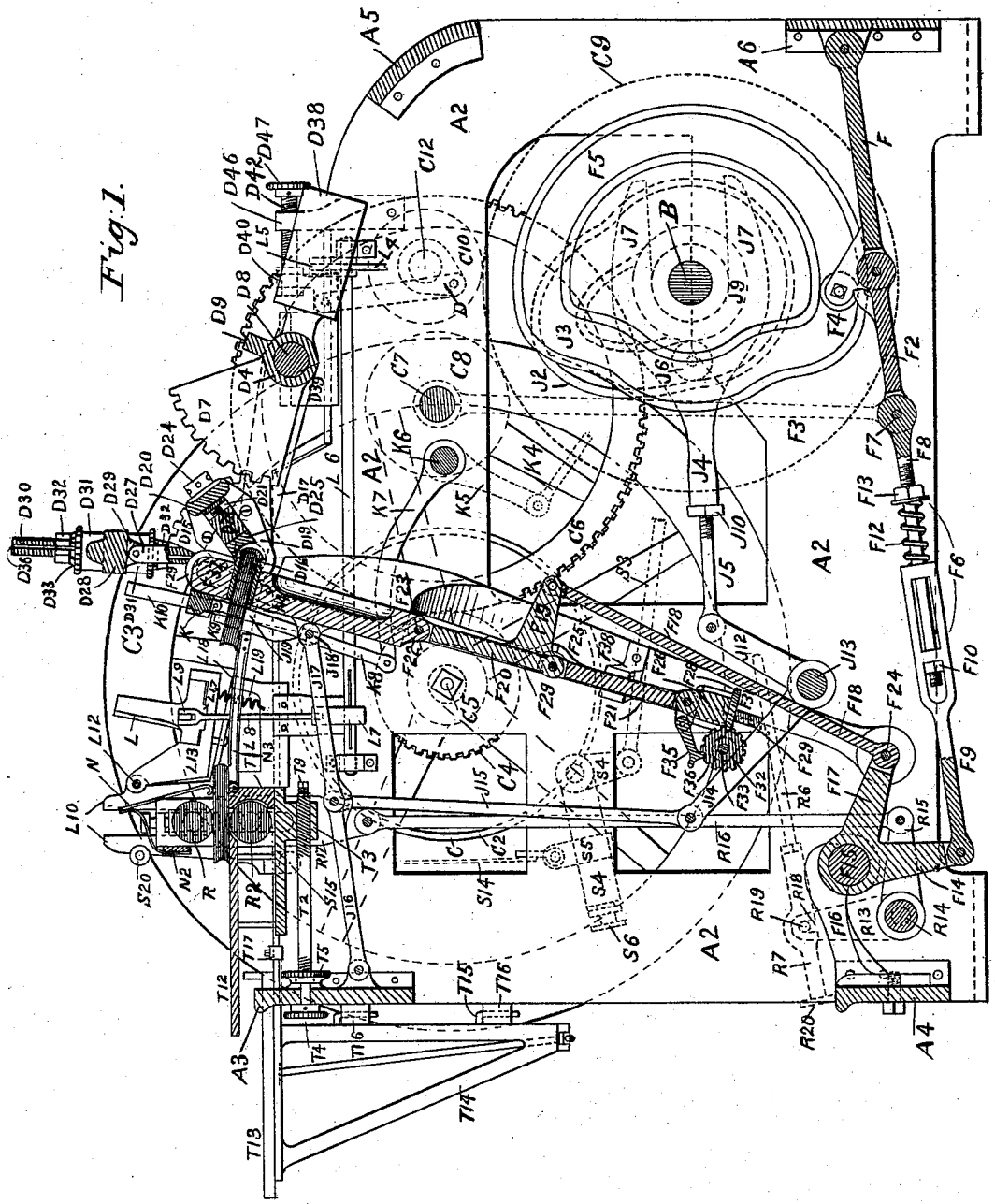
Figure 2:
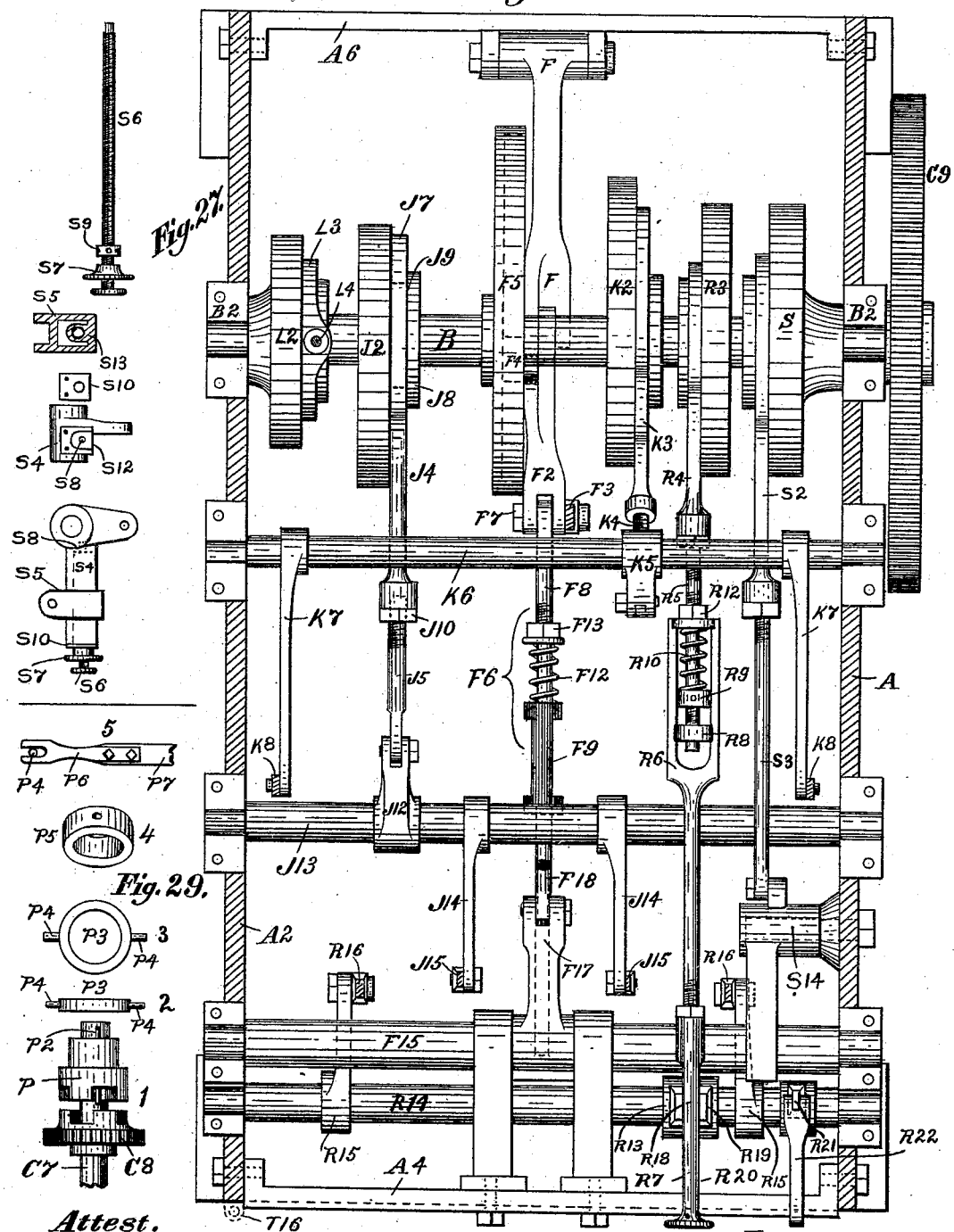

In the accompanying drawings, making part of this specification, Figure 1, Sheet 1, is a vertical central longitudinal section of a rounding and backing machine embodying my invention. Fig. 2, Sheet 2, is a plan view of the rods and other devices for imparting motion directly to the mechanism acting immediately upon the book, and also a plan view of the main shaft and its provisions for imparting motion to said rods and devices. Fig. 3, Sheet 3, represents a top view of the gearing, whereby power is applied to and removed from the said main shaft. Fig. 4, Sheet 4, is a side view of the mechanism for bracing the reciprocating jaws when the latter are in position for backing the book, the cross-bar of said mechanism being in section; secondly, showing the quadrants or arms for oscillating the plate for backing the book and the immediate mechanism for operating the quadrant, the shaft and sleeve being shown in vertical section transverse to the shaft; thirdly, showing in elevation the mechanism for operating the clutch; fourthly, showing in part the mechanism for adjusting the center on which the forward quadrants oscillate, part of such mechanism being in elevation and the cross-bar being shown in section. Fig. 5, Sheet 5, is a front elevation of the gearing referred to in Fig. 3, and also of the mechanism for adjusting the center on which the forward quadrant oscillates, the cross-bar being shown in elevation, and also showing, lower down, in elevation, the cross-bar for bracing the reciprocating jaws when the latter are in position for backing the book and the uprights or slide pieces, whereby said bar is supported and on which it slides. Fig. 6, Sheet 5, shows in front elevation the rounding-rollers, the chains for giving a forward motion to the rollers, the lever for operating said chains, and also shows the belt and weight in position for giving a return motion to the rollers, and also shows the device for preventing the back of the book from springing upward while being rounded, and also shows the center screw for operating the carriage, and shows the side hand-screw for locking the carriage, the lugs for supporting the movable table, and the tubular rest. Fig. 7, Sheet 3, represents in section the upper rounding-roller, the spring for preventing the back of the book from springing upward while being rounded, and the bar for supporting said spring, and shows in elevation the reciprocating roller-support and the adjustable journal-box located in said reciprocating support and carrying the roller-journal. Fig. 8, Sheet 6, shows in section, enlarged, the center screw mentioned in the description of Fig. 6 and lock-nut, and shows a stop-screw and lock-nut therefor, the stop-screw being shown in elevation. Fig. 9, Sheet 5, shows in side elevation, seen from that side of the machine which is at the right hand in Fig. 2, the chains and belt and weight referred to in the description of Fig. 6.
Fig. 10, Sheet 3, shows a front elevation and also a side elevation of the chain and of the sleeve to which it is fastened, and also illustrating the mode of connecting the chain to the sleeve. Fig. 11, Sheet 6, is a view in perspective of the removable table, its immediate supports, and the preferred manner in which the table is connected to said supports. Fig. 12, Sheet 4, is a side elevation of a part of the carriage for carrying the rounding-rollers, and connected thereto a rocking base for the arm which carries the guides for locating the book when first inserted in the machine. Fig. 13, Sheet 3, shows a side view and also a top view of the arm referred to in the description of Fig. 12. Fig. 14, Sheet 4, is a perspective view of the bar and straps suspended therefrom for adjusting the centers on which the forward quadrants oscillate; also, the arms for supporting those centers, the rear quadrants, the sleeve to which they are attached, the shaft on which the sleeve oscillates, the adjustable lever of the sleeve, the pitman and crank by which said sleeve is operated, and shaft-carrying pinion for operating said crank, and also showing weight for balancing the quadrants and parts attached thereto. Fig. 15, Sheet 6, shows in side elevation the adjustable journal-box or carriage for supporting the journal of the shaft carrying the sleeve referred to in the description of Fig. 14, and also shows in section (detailed view) the said journal-box and the slide it moves on and an end of the shaft it (said box) carries, the section being taken through the line X X of said side elevation and looking at the said section from the rear of the machine, and also shows in section (detailed view No. 2) the rear end of the box or carriage, the adjusting screw-rod and cap, the section being taken at the line Z Z of said side elevation. Fig. 16, Sheet 6, shows a top and side view of the cross-bars referred to in the description of Fig. 5, the bars being here shown detached. Fig. 17, Sheet 6, shows in end elevation, full sized, four typical forms of plates for backing books, such forms being of my invention. Fig. 18, Sheet 6, is a perspective view of the bar to which the plates of the preceding figure are attached and showing one plate in position attached to the bar. Fig. 19, Sheet 5, is a front elevation of the oscillating frame which carries the jaws and the toggle-joint for vertically reciprocating the upper jaw and the worms and wheels for operating nuts (also shown) for adjusting the height of the upper jaw above the lower jaw, and thereby regulating the pinch of the book. This figure also shows a front elevation of the jaws in position in said frame; also shows the guides for steadying the lower ends of the rods that carry the upper jaw. At the foot of said figure is also shown a detail view of the cross-bar which carries the said nuts and toggle. Fig. 20, Sheet 4, is a front elevation, enlarged, of the upper jaw, showing the springs attached to the upper jaw and upright rods carrying the upper jaw, and also below at the left shows a cross-section, enlarged, of the aforesaid device taken at the dotted line X X, and at the right shows an end view of the device shown in the upper part of this figure. Fig. 21, Sheet 3, is a plan view of the toggles for throwing the jaws over and back. Fig. 22, Sheet 3, is a top view of the toggle (shown in Fig. 1 as located at the base of the machine) for operating the toggles shown in Fig. 19. Fig. 23, Sheet 6, is a side elevation of an improved device for supporting a rod operated on by a cam, below showing a top detached view of the yoke and roller of said device; also a view, detached, of the cam and its devices for receiving said yoke and roller. Fig. 24, Sheet 5, shows a side view and also a bottom view of the braces (shown at the lower left-hand corner of Fig. 1) for bracing the shaft which operates the toggle which operates to open and close the jaws, which toggle is referred to in the description of Fig. 19. Fig. 25, Sheet 5, is an enlarged view of one of the nuts referred to in the description of Fig. 19. Fig. 26, Sheet 3, is a side elevation, partly in section, of the device for throwing out of gear and disconnecting the rod that reciprocates the upper rounding-roller and also for raising the roller and holding it up, as described. Fig. 27, Sheet 2, shows at the left a side elevation of the lever for operating the chains, which in turn operate the rounding-rollers, the chains being shown in Figs. 6, 9, and 10, and shows at the center an elevation of the end of said lever, looking at that end of the lever which is at the left hand in said elevation, and also shows an end view of the carriage-piece shown on the center of the lever in the said side elevation. The lever herein referred to is shown in Fig. 1. This Fig. 27 also shows a side view of the stop-plate and also a view of the screw and lock-nut, enlarged, for setting said carriage-piece. Fig. 28, Sheet 4, shows views, enlarged, of the devices shown at the top of Figs. 1 and 5 for adjusting the bar which regulates the position of the center on which the backing-plate operates the devices shown in this figure, being a top view of the adjusting-nut, a side elevation, and also a top view of the stop-collar for locking the said nut, and also a side elevation of the screw, decreased, with the groove in which the feather or pin of the lock-collar moves. Fig. 29, Sheet 2, shows five detail views of the clutch for throwing the machine into and out of action, Detail No. 1 being a side elevation of the two parts of the clutch in position on the shaft. Detail No. 2 is an edge view, and No. 3 a side view of the collar, with trunnions, which fits onto that end of the clutch which is at the right hand in Detail No. 1. Detail No. 4 is a view in perspective of the collar which holds the said trunnion-collar in place, and Detail No. 5 is a top view of the forked lever (shown in position in Fig. 4) which engages with the trunnions and enables the two main portions of the clutch to be thrown in and out of engagement with one another. Fig. 30, Sheet 6, shows four detail views. Detail No. 1 is a perspective view, enlarged, of the hand-lever for working the forked lever shown in Fig. 4.

Detail No. 2 shows in perspective, enlarged, a stop-pin that engages with hand-lever. Detail No. 3 is a front elevation of the upper right-hand corner of the machine, showing the means (i. e., bracket) for supporting the main lever, and showing said lever at its junction with such support. Detail No. 4 is a top view of the corner of the machine, and shows the bracket, the lever removed, the bracket being shown in side elevation in Fig. 4. Fig. 31, Sheet 6, shows in horizontal section the devices for carrying and adjusting the bar which supports the backing-plate and the quadrant by which the plate is oscillated. Fig. 32, Sheet 6, shows the guide-arm and guide-carriers and guides when down and in position to stop the book, the carriage, rounding rollers, book, and guide-arm being shown in section, taken in a plane running parallel to the length of the machine. Fig. 33, Sheet 6, shows the oscillating piece, its supporting-base, guide-arm, guide-carriers, and guides. the oscillating piece, its base, the guide-arm, and the upper ends of the guide-carriers being shown in section taken in a vertical plane transverse to the length of the machine at the dotted line X X of Fig. 12, the view being taken looking from the rear of the machine toward the front of the latter. Fig. 34, Sheet 7, is a side view, in elevation, of the preferred detailed construction of the mechanism for swinging the jaws backward and forward. Fig. 35, Sheet 7, is a side elevation of the preferred mechanism for actuating the brace-bar for steadying or bracing the jaws while the book is being backed, and showing the brace-bar in section, the section being taken at the dotted line X X, Fig. 36. Fig. 36, Sheet 7, is a top view of the preferred form of cross-bar.

A, Figs. 2, 3, 4, 5, 6, 15, 30, indicates the right side of the frame of the machine, and $A^2$, Figs. 1, 2, 3, 5, 6, indicates the left side of the machine. The preferred means of connecting these sides together is as follows: The sides $A$ $A^2$ are connected at their upper front portions by the cross-piece $A^3$, Figs. 1, 6, 21, and at their lower front portions by the cross-piece $A^4$, Figs. 1, 2, 3, 26, and at their upper rear portions by the cross-piece $A^5$, Fig. 1, and at their lower rear portions by the cross-piece $A^6$, Figs. 1, 2, 3. 22.

The main shaft B, Figs. 1, 2, 3, 4, 5, 23, is supported by and journaled in boxes $B^2$ $B^2$, Figs. 2, 3, respectively located at the respective sides $A$ $A^2$ of the said frame.

The series of gearing for operating the main shaft consists of the loose pulley C, tight pulley $C^2$, fly-wheel $C^3$, and pinion $C^4$, all revolving loosely on a stud or pin, $C^5$, fixed to and projecting from the side $A^2$ of the frame, Figs. 1, 3, 5. The pulley $C^2$, fly-wheel $C^3$, and pinion $C^4$ are all rigidly connected together. The pinion $C^4$ meshes with the gear-wheel $C^6$, Figs. 1, 3, 5, and gear $C^6$ is rigidly fixed to shaft $C^7$, Figs. 1, 3, 4, 5, 29, and is concentric therewith. Running loose on the shaft $C^7$, at the other side of the machine, is the clutch-pinion $C^8$, Figs. 1, 3, 4, 5, 29, meshing with a gear, $C^9$, Figs. 1, 2, 3, 4, 5. This gear $C^9$ is rigidly fixed on main shaft B. With gear $C^9$ meshes pinion $C^{10}$, Figs. 1, 3, 4, 14. (See Figs. 3, 4, and dotted lines in Fig. 1.) The pinion $C^{10}$ is rigidly fixed on shaft $C^{12}$, Figs. 1, 3, 4, 5, 14, journaled in the side A of the machine and carrying crank D, Figs. 1, 3, 4, 5, 14. Crank D is pivotally connected to the lower end of a rod, $D^2$, Figs. 1, 3, 4, 14, whose upper end is pivotally connected to and operates the adjustable lever $D^3$, Figs. 4, 14, which latter oscillates the sleeve $D^4$, Figs. 1, 4, 14. The operating length of the lever $D^3$ is determined by the position of the set-pin $D^5$, Figs. 4, 14, in the slot $D^6$, Figs. 4, 14, of the said lever $D^3$, and determines the length of the arc of oscillation of the quadrants $D^7$, Figs. 1, 4, 14, fixed to sleeve $D^4$, oscillating on shaft $D^8$, Figs. 1, 4, 14.

A preferred means for changing the position of the arc of motion of the said quadrants is as follows: Rigidly attached to sleeve $D^4$ is lug $D^9$, Figs. 1, 4, 14, whose end comes between the lugs $D^{10}$, Figs. 4, 14, on the collar $D^{12}$, Figs. 4, 14, to which latter, in the present instance, the lever $D^3$ is rigidly attached. Through the lugs $D^{10}$ and the lug $D^9$ passes a screw-rod, $D^{13}$, Figs. 4, 14, screwed or fixed to the lugs $D^{10}$, but loose within lug $D^9$. On this screw-rod $D^{13}$ are the set-nuts $D^{14}$ $D^{14}$, Figs. 4, 14, one of said nuts on one side of the lug $D^9$ and the other of said nuts on the other side of the lug $D^9$. By means of this screw-rod $D^{13}$ and said nuts $D^{14}$ the position of the lug $D^9$, in respect to the lugs $D^{10}$ is altered at will, and thus the position of the sleeve and its quadrants in relation to the rod $D^2$, and consequently the position of the arc of motion of the quadrants, is changed.

It is to be remembered that the collar $D^{12}$ is loose on the sleeve $D^4$.

The arcuate surface of each of the quadrants $D^7$ is provided with cogs respectively meshing with cogs on the arcuate surface of the adjacent opposing quadrants, $D^{15}$, Figs. 1, 4, 31, the latter oscillating on a center or pin, $D^{16}$, Figs. 1, 4, 14, 31. This pin $D^{16}$ is supported in the ends of the arms $D^{17}$, Figs. 1, 14, the other ends of said arms $D^{17}$ being rigidly attached to the shaft $D^8$.

Rigidly attached to the quadrants $D^{15}$ is the frame $D^{18}$, Fig. 31, consisting of the two broad flat end projections, $D^{19}$ $D^{19}$, Figs. 1, 31, connected together by a cross-tie portion, $D^{20}$, Figs. 1, 31. In each of the end portions, $D^{19}$ $D^{19}$, is a slot, $D^{21}$, Figs. 1, 31, and in one of these slots fits one of the lugs $D^{22}$, Figs. 18, 31, of piece $D^{23}$, Figs. 1, 18, 31, and into the other of these slots fits the other of the lugs $D^{22}$. The piece $D^{23}$ is held in position and adjusted back and forth to the desired points in said slots by the screws $D^{24}$ $D^{24}$, Figs. 1, 31. To the forward portion of said piece $D^{23}$ is attached the backing-plate $D^{25}$, Figs. 1, 17, 18, 31, and secured by the bolts $D^{26}$, Figs. 17, 18, 31. Each of the center pivots or pins, $D^{16}$, is supported within adjustable limits by means of its respective adjacent rods $D^{27}$, Figs. 1, 4, 14. The cross-bar $D^{28}$, Figs. 1, 4, 5, 14, 16, has near each end a lug, $D^{29}$, Figs. 1, 4, 5, 14, 16. To one of these lugs $D^{29}$ the upper end of one of these rods $D^{27}$ is pivoted, and to the other of these lugs $D^{29}$ the upper end of the other of these rods $D^{27}$ is pivoted. The cross-bar $D^{28}$ is supported by and slides on the upright screw-bars $D^{30}$, Figs. 1, 4, 5, 28, rigidly attached at their lower ends to the frame of the machine. The cross-bar $D^{28}$ is capable of adjustment vertically, preferably, by means of the nuts $D^{31}$ $D^{31}$ $D^{31}$ $D^{31}$, Figs. 1, 4, 5, 28, as follows: On each upright screw-bar $D^{30}$ are two nuts, as $D^{31}$, one of these nuts being below the cross-bar $D^{28}$ and the other above the said cross-bar. These nuts may be caused to pinch the cross-bar $D^{28}$ tightly between them, or, as will sometimes be necessary, they may be set apart, so as to allow the cross-bar a little play between them. Each nut is set at the desired point on its respective upright bar by means of a lock-collar, $D^{32}$, Figs. 1, 4, 5, 28. For engagement with said lock-collar, each nut $D^{31}$ is provided with radial slots $D^{33}$, Figs. 1, 4, 5, 28. The lock-collar $D^{32}$ is provided with a lug, $D^{34}$, Figs. 4, 28, which enters one of the slots $D^{33}$ in the adjacent nut, and with a feather, $D^{35}$, Fig. 28, which enters a longitudinal groove, $D^{36}$, Figs. 1, 28, in the upright screw-bar $D^{30}$. The feather $D^{35}$ and lug $D^{34}$ are preferably made in one piece.

In setting a nut $D^{31}$ its lock-collar is slid away from it until the lug $D^{34}$ is withdrawn from a slot of the nut. The latter is then screwed up or down on its screw-bar $D^{30}$ to the requisite point. The lug $D^{34}$ of the lock-collar is now inserted in the adjacent slot of the nut and the latter is locked, and its collar is prevented from rotating on screw-bar $D^{30}$ by means of the feather $D^{35}$ in the groove $D^{36}$, Figs. 1, 28. The lower lock-collar on each screw-upright $D^{30}$ is held up to place against its adjacent nut by means of a spring, $D^{37}$, as shown in Fig. 5. A counterbalance-weight, $D^{38}$, Figs. 1, 4, 14, rigidly attached at the rear side to sleeve $D^{4}$, operates to balance the four quadrants $D^{7}$ $D^{7}$ $D^{15}$ $D^{15}$ and the intermediate connected mechanism.

The preferred mode of adjusting the pressure of the backing-plate against the book to be backed is by adjusting the shaft $D^{8}$, and the mechanism for adjusting said shaft is as follows: Each end of shaft $D^{8}$ is journaled in its carriage $D^{39}$, Figs 1, 15, sliding on its respective frame, one of said frames being A and the other $A^{2}$. The rear end, $D^{40}$, Figs. 1, 15, of the carriage receives the forward portion of a rod, $D^{42}$, Figs. 1, 15, which latter fits in a recess in said carriage and can turn therein. The rod carries two shoulders, one, $D^{43}$, directly in front of the carriage end $D^{40}$, and the other, $D^{44}$, Fig. 15, directly behind said carriage end, and these shoulders prevent the rod from slipping lengthwise through the said end of said carriage. A cap, $D^{45}$, Fig. 15, screwed to said end $D^{40}$ of said carriage, keeps the rod $D^{42}$ from slipping out at the top of its bearing in said end $D^{40}$. This rod is rearwardly provided with a screw-thread engaging a female screw in the lug $D^{46}$, Figs. 1, 4, 15, fixed to and projecting upward from the adjacent portion of the frame of the machine. A hand-wheel, $D^{47}$, Figs. 1, 15, enables the rod to be easily turned, thereby moving the carriage $D^{39}$ forward or backward, as desired, and a set-screw, $D^{48}$, Fig. 15, screwed into the cap $D^{45}$ aforesaid, engages one of the holes in shoulder $D^{44}$ and prevents the rod $D^{42}$ from turning after the latter has been set at the desired point.

The preferred mechanism for working the upper one of the jaws which hold the book while it is being backed is as follows: To the brace $A^{6}$ is pivoted one end of the arm F, Figs. 1, 2, 22, the other end of said arm being pivoted to the arm $F^{2}$, Figs. 1, 2, 22, which latter in turn is pivoted by pivot $F^{7}$ to the rod $F^{3}$, (shown in dotted lines in Fig. 1,) Figs. 1, 2. The arms F and $F^{2}$ constitute a toggle-joint. The mode of operating this toggle is as follows: The roller $F^{4}$, Figs. 1, 2, is pivoted to one of the arms of the toggle, preferably to the arm F. This roller $F^{4}$ fits in a groove in cam $F^{5}$, Figs. 1, 2, centered on and fixed to main shaft B. The rod $F^{3}$ may be supported on any suitable bracket or shaft. In the present instance the shaft $C^{7}$ is made use of for supporting the said rod $F^{3}$, the latter being pivoted thereto. To the same end of arm $F^{2}$ as rod $F^{3}$, and to pivot $F^{7}$, Figs. 1, 2, 22, is pivoted one end of the compound thrust-rod $F^{6}$, Figs. 1, 2, constructed substantially as follows: The lever $F^{6}$ is constructed in two parts, $F^{8}$ and $F^{9}$, Figs. 1, 2, the portion $F^{8}$ running through a bracket or portion of part $F^{9}$, and secured in place by a nut, $F^{10}$, Fig. 1, screwed onto part $F^{8}$ forward of said bracket. A spring, $F^{12}$, Figs. 1, 2, is compressed between the rear end of arm $F^{9}$ and the stop $F^{13}$, Figs. 1, 2, on arm $F^{8}$. This stop $F^{13}$ is preferably a nut engaging a thread on arm $F^{8}$ for the purpose of regulating the tension of the spring $F^{12}$. The portion $F^{8}$ is free to slide forward in part $F^{9}$ as the tension of spring $F^{12}$ is overcome. The object of this compound thrust-rod is to allow the mechanism closing the jaws holding the book to be backed to yield (instead of breaking) when a book of uncommon thickness to which the jaws and mechanism have not been previously adjusted is by chance inserted into the jaws. The forward end of the compound thrust-rod is pivoted to the lever $F^{14}$, Fig. 1, which latter is fulcrumed on shaft $F^{15}$, Figs. 1, 2. This shaft is suitably supported, as in journals, in the sides A $A^{2}$ of the machine, and is preferably braced by brackets $F^{16}$, Figs. 1, 2, 24, connected to forward brace, $A^{4}$.

On shaft $F^{15}$ is fulcrumed the lever $F^{17}$, Figs. 1, 2, preferably made in one piece with lever $F^{14}$. To the free end of this lever $F^{17}$ is pivoted the lower end of rod $F^{18}$, Figs. 1, 2, and the upper end of the latter is in turn pivoted to a lug, F$^{19}$, Figs. 1, 19, rigidly attached to the lower portion of the upper plate or limb, F$^{20}$, of the toggle F$^{20}$ F$^{21}$, Figs. 1, 19.

It may be here remarked that the yielding compound rod F$^9$ F$^8$ F$^{12}$ may take the place of rod F$^{18}$, a rigid rod taking the place where the said compound rod is now employed. In the event of such change this compound yielding rod will become a pull-rod instead of a thrust or push rod, and be similar, as regards the location of the spring, to the pull-rod R$^5$ R$^6$, Fig. 2. The upper portion of the upper limb of said toggle is pivoted by pivot F$^{22}$, Figs 1, 19, to the oscillating frame F$^{23}$, Figs. 1, 19, carrying the jaws, the said oscillating frame being pivoted at pivot F$^{24}$, Figs. 1, 19, to the lower portion of the sides A A$^2$ of the machine.

Each of the limbs F$^{20}$ F$^{21}$ of the toggle is provided with stop F$^{25}$, Fig. 1, and these stops (when the toggle is closed) impinge against each other and prevent the toggle from passing its center. The lower link or limb, F$^{21}$, of this toggle is pivoted at its lower end to the yoke or piece F$^{26}$, Figs. 1, 19. This yoke is provided at each end with an eye or forked extremity, F$^{27}$, Fig. 19, which embraces a nut, F$^{28}$, Figs. 1, 19, 25, whose screw-thread engages a screw on the upright rod F$^{29}$, Figs. 1, 19, 20. The nut F$^{28}$ is prevented from slipping through the openings in piece F$^{26}$ by the annular flanges F$^{30}$, Figs. 19, 25, of the nut. At the lower side of the nut, and rigidly attached thereto and concentric therewith, is a toothed wheel, F$^{31}$, Figs. 1, 19. 25, and for convenience this wheel may take the place and operate instead of a lower annular flange. Each wheel F$^{31}$ engages a worm, F$^{32}$, Figs. 1, 19, and these two worms are connected by and rigidly attached to a shaft, F$^{33}$, Figs. 1, 19, journaled in suitable lugs, F$^{34}$, Fig. 19, which latter prevent longitudinal motion of the shaft. The shaft is rotated by suitable means—preferably, as shown, by a hand-wheel, F$^{36}$, Figs. 1, 19, peripherally provided with square teeth—and after being set is locked in position by a pawl, F$^{35}$, Fig. 1. The nuts F$^{28}$, wheels F$^{31}$, shaft F$^{33}$, and hand-wheel F$^{36}$ are to simultaneously adjust vertically the upper jaw, F$^{37}$.

For the purpose of the better keeping the upright rods F$^{29}$ steady and in line with the oscillating frame F$^{23}$, the arms F$^{38}$, Figs. 1, 19, are provided, suitably secured to said frame F$^{23}$, and respectively embrace the rods. Near their upper ends a portion of the upright rods is confined to the slideways F$^{39}$, Fig. 19, in oscillating frame F$^{23}$, and they are thereby permitted to slide vertically in said frame. The upper extremity of each upright rod F$^{29}$ is provided with a slot, F$^{40}$, Fig. 20, through which latter passes a snugly-fitting lug, F$^{41}$, Figs. 19, 20. These lugs are rigidly attached to the upper jaw, F$^{37}$, Figs. 1, 19, 20. To the under side of this upper jaw is rigidly attached a steel plate, F$^{42}$, Figs. 19, 20, which projects beyond the rear side of the jaw in an edge, F$^{46}$, Fig. 20.

Connected to the upper jaw, F$^{37}$, preferably at the side, as shown, by straps F$^{44}$, Figs. 19, 20, are the flat springs F$^{43}$, Figs. 19, 20, secured from slipping down through their straps by flanges or shoulders at their upper edges. These springs extend down and then under the jaw toward the beveled edge of the plate F$^{42}$. The end of each spring shoulders in a recess, F$^{45}$, Fig. 20, in the plate F$^{42}$, which recess extends rearward from the front edge of the plate to near the beveled edge of said plate. This spring is bent at a less angle than ninety degrees, and when not under pressure stands at a distance from the under side of the jaw, but when pressed upon closes into the recess in said jaw. When a book is placed between the upper jaw, F$^{37}$, and the lower jaw, J, Figs. 1, 19, as the upper jaw descends the heel of the spring strikes first, and as the jaw continues to descend the pressure of the spring forces any wrinkling or buckling of the book rearward into the back of the book. As the spring is forced upward, the upright portion of the spring slides through the strap F$^{44}$, and the spring is deflected from its normal position to an angle of about forty-five degrees.

I will now describe the mechanism which co-operates to impart to the oscillating frame the required action and to hold it to its required positions.

On the main shaft B is fixed a cam, J$^2$, Figs. 1, 2, 23, having a groove, J$^3$, Figs. 1, 23. To the reciprocating piece J$^5$ J$^4$, Figs. 1, 2, 23, is pivoted the roller J$^6$, Figs. 1, 23, which latter fits in the cam-groove J$^3$. The rear part, J$^4$, of the reciprocating piece is provided with the fork J$^7$, Figs. 1, 2, 23. The two inner edges of these limbs are parallel, and the limbs are in the same vertical plane. The fork J$^7$ straddles the hub J$^8$, Figs. 2, 23, of the cam, the limbs of the fork respectively fitting into an annular groove, J$^9$, Figs. 1, 2, 23, in said hub, and keeps the reciprocating piece J$^4$ J$^5$ in line.

The reciprocating rod J$^4$ J$^5$ is preferably provided with means for adjusting its length and taking up wear. These means consist as follows: The piece J$^5$ is screwed into piece J$^4$ and secured by a lock-nut, J$^{10}$, Figs. 1, 2, 23. The forward end of rod J$^4$ J$^5$ is pivoted to one end of lever J$^{12}$, Figs. 1, 2, and the other end of lever J$^{12}$ is rigidly secured to shaft J$^{13}$, Figs. 1, 2, and the latter is journaled in the sides of the machine. Rigidly attached to said shaft are the levers J$^{14}$ J$^{14}$, Figs. 1, 2, and to the forward ends of these levers J$^{14}$ J$^{14}$ are respectively pivoted the rods J$^{15}$ J$^{15}$, Figs. 1, 2, 21, and the upper ends of the latter are respectively pivoted to the respective knuckle-joints of the toggles J$^{16}$ J$^{17}$ J$^{16}$ J$^{17}$, Figs. 1, 21.

The forward end of the piece J$^{16}$ of each toggle J$^{16}$ J$^{17}$ is pivoted to brace A$^3$ at the upper forward corner of the machine. The rear end of each of the pieces J$^{17}$ of said toggles is pivoted by pivot J$^{18}$, Figs. 1, 19, 21, to the front of the oscillating frame F$^{23}$, a little below the lower jaw, J. (See Figs. 1 and 21.) The upper or working side of lower jaw, J, is provided with a facing of steel in the form of a steel plate, $J^{19}$, Figs. 1, 19, 21, similar to the plate $F^{42}$ on the upper jaw, $F^{37}$.

I will now describe the mechanism for vertically reciprocating the cross bar K, employed to brace the jaws $F^{37}$ and J.

On the main shaft B is rigidly fixed a grooved cam, $K^2$, Figs. 2, 4, whose construction is similar to that of cam $J^2$, already described. A reciprocating rod, $K^3 K^4$, Figs. 1, 2, 4, and its attachments is similar to rod $J^4 J^5$, already described, and is operated by its cam $K^2$ as rod $J^4 J^5$ was operated by cam $J^2$. Lever $K^5$, shaft $K^6$, levers $K^7 K^7$, and rods $K^8 K^8$, Figs. 1, 2, 4, are similar in construction, attachment, and in operation to the corresponding levers, $J^{12}$, shaft $J^{13}$, and levers $J^{14} J^{14}$, and rods $J^{15} J^{15}$. The upper ends of the rods $K^8 K^8$ are respectively pivoted to the respective lugs $K^9 K^9$, Figs. 1, 4, 16, of the cross-bar K, Figs. 1, 4, 16. This cross-bar K slides up and down on fixed bars $K^{10}$, Figs. 1, 4, 5, secured to the sides of the frame.

I will now describe the mechanism for raising and lowering the guide-arm L, Figs. 1, 13, 32, 33.

Rigidly fixed on main shaft B is the grooved cam $L^2$, Fig. 2, similar to cam $J^2$, and operated thereby is the forked reciprocating rod $L^3 L^4$, Figs. 1, 2, with its attachments similar to rod $J^4 J^5$. The upper end of forked lever $L^3 L^4$ is pivoted to a lever, $L^5$, Fig. 1, rigidly fixed to shaft $L^6$, Fig. 1, suitably supported on bearings on the left hand frame, parallel to the length of the machine. On the forward end of this shaft is a lever, $L^7$, Fig. 1, capable of sliding on the said shaft in the direction of the length of the latter, and prevented from turning on the shaft by means of a feather. To lever $L^7$ is pivoted rod $L^8$, Figs. 1, 33, and the upper end of this rod $L^8$ is pivoted to a lug, $L^9$, Figs. 1, 13, 33, on arm L.

The object of the sliding connection between lever $L^7$ and shaft $L^6$ is to enable lever $L^7$ to continue always perpendicular to the guide-arm L as the latter is shifted in position.

Each end portion of the carriage T, Figs. 1, 6, 12, is provided with a pair of uprights, $L^{10} L^{10}$, and these serve as guides for the respective journal-boxes of the upper roller, R, Figs. 1, 6. The journals of the lower roller, $R^2$, Figs. 1, 6, fit in bearings in the carriage at the base of the uprights. (See Fig. 12.)

I will now describe the mechanism for swinging the guide in a peculiar manner away from the book before it (the guide) rises perpendicularly.

To the rear one of the left-hand pair of uprights $L^{10}$ is hinged, at $L^{12}$, Figs. 1, 12, an oscillating piece, $L^{13}$, Figs. 1, 12, 33, to which the aforementioned arm L is pivoted by means of the pivot-pin $L^{14}$, Figs. 12, 33. To the outer end of this arm L are fixed the guide-carriers $L^{15}$, Figs. 32, 33. Each of these carriers $L^{15}$ carries its guide-piece or guides $L^{16}$, Figs. 32, 33. In rounding and backing large books the forward edges of the guide-pieces $L^{16}$ are preferably concaved, and the swinging motion which is imparted to the guide-pieces $L^{16} L^{16}$ in moving away from the book before rising becomes essential in order to prevent these guide-pieces from hooking under the book and injuring or shifting the latter as they are elevated out of the way.

In Fig. 1 the guide-arm L is shown elevated, with the guide pieces removed. The guide-arm is drawn down by rod $L^8$, aforementioned, and as it (the arm) moves down its shoulder $L^{17}$, Figs. 1, 13, 33, impinges against the side of the oscillating piece $L^{13}$. As the arm L continues to be drawn down it acts as a lever upon the oscillating piece, and brings down said piece until the bottom of the latter strikes the upper edge of the supporting-base $L^{18}$, Figs. 1, 12, 33. The arm L has now reached the lower end of its movement, and the guides $L^{16} L^{16}$ are now in position to stop the book at the desired point as it (the book) is introduced between the rounding-rollers R $R^2$. When the guide-arm is to be elevated, the rod $L^8$ rises and the guides swing rearward and upward as the oscillating piece $L^{13}$, with guide-arm L, is rising from the base $L^{18}$, thereby clearing the book. This upward rearward movement is primarily caused by the spring $L^{19}$, Figs. 1, 12, 33, raising the oscillating piece $L^{13}$ from its base $L^{18}$, this spring $L^{19}$ being fixed in or secured to the base and pressing against the lower side of $L^{13}$. The upward movement of this oscillating piece is arrested by any suitable device—as, for example, stop-piece $L^{20}$, Fig. 12. As soon as the oscillating piece $L^{13}$ ceases to rise, the arm L is raised vertically by the rod $L^8$ to the position shown in Fig. 1, and it and the guides are out of the way of the jaws and other mechanism. This last-named vertical movement of the arm L after the oscillating piece has risen is provided, instead of a further swinging movement, to facilitate compactness in the machine.

I will now describe the mechanism that reciprocates the upper roller, R, Figs. 1, 6, 7, 9, 32, which latter operates in connection with lower roller, $R^2$, Figs. 1, 6, 9, 32.

Fixed on main shaft B is the grooved cam $R^3$, Fig. 2, similar to cam $J^2$. Forked reciprocating rod $R^4 R^5$, Fig. 2, and its attachments are similar to rod $J^4 J^5$, heretofore described, and its engagement with grooved cam $R^3$ and its hub is similar to the engagement of rod $J^4 J^5$ with cam $J^2$ and its hub. The forward end of rod $R^4 R^5$ is connected to a compound pull-rod, $R^6 R^7$, Figs. 1, 2, 26. Rearward the piece $R^6$ has a hollow extremity, and through the rear end of this extremity passes the end of the rod-piece $R^5$, and is continued on and passed through the guide $R^8$, Fig. 2, fixed to the rod-piece $R^6$. The rod-piece $R^5$ is free to slide in the rod-piece $R^6$ and guide $R^8$. Screwed onto the rod-piece $R^5$ in the rod piece $R^6$ is a nut, $R^9$, Fig. 2, free to slide within said rod $R^6$.

Between the nut $R^9$ and the rear end of the rod-piece $R^6$ is a spiral spring, $R^{10}$, Fig. 2, the resilience of which is regulated by the said nut $R^9$. Rearward of the end of rod-piece $R^6$ is a stop, $R^{12}$, Fig. 2, on piece $R^5$, which stop prevents the rod-piece $R^5$ from being drawn too far into the rod-piece $R^6$ by the spring $R^{10}$, and so serves, in conjunction with nut $R^9$, to regulate the resilience of said spring $R^{10}$. The forward piece, $R^7$, of the compound pull-rod $R^6$ $R^7$ is pivotally connected to a lever, $R^{13}$, Figs. 1, 2, 26, rigidly attached to the shaft $R^{14}$, Figs. 1, 2, 26, suitably journaled in the sides of the machine. To this same shaft, $R^{14}$, are rigidly connected the levers $R^{15}$ $R^{15}$, Figs. 1, 2, 26.

To each of the levers $R^{15}$ is pivoted its respective rod $R^{16}$, Figs. 1, 2, 26, and these rods $R^{16}$ are pivoted to the sliding yoke $R^{17}$, Figs. 1, 6, 7, that carries the upper roller, R. When preferred, compound rod $R^5$ $R^6$ may be solid and the capacity for yielding be embodied in the rods $R^{16}$ $R^{16}$, in which event each of the rods $R^{16}$ will be compound and provided with spring and be similar in construction to that now presented in the compound rods $R^5$ $R^6$.

The preferred means for adjusting the upper roller so as to regulate the distance to which it shall approach the lower roller and for raising the upper roller at will and throwing it out of connection with the mechanism for vertically reciprocating it is as follows: The piece $R^7$ is united to piece $R^6$ by a screw-thread, and the piece $R^7$ has a hook, $R^{18}$, Figs. 1, 2, 26, which, when the compound pull-rod $R^6$ $R^7$ is dropped, engages the pin $R^{19}$, Figs. 1, 26, on the upper end of lever, $R^{13}$. For more conveniently lifting the rod $R^6$ $R^7$ from pin $R^{19}$ and lowering it to engage said pin, and also for rotating part $R^7$ to lengthen or shorten $R^6$ $R^7$, I provide a suitable handle, as $R^{20}$, Figs. 1, 2, 26, connected to said hook $R^{18}$ on rod $R^7$. By disengaging the hook $R^{18}$ from the pin and rotating the piece $R^7$ the compound pull-rod $R^6$ $R^7$ is lengthened or shortened by the screw-thread uniting the portions $R^6$ $R^7$ of the pull-rod. As the pull-rod is shortened, the upper roller is made to approach closer to the under roller, and vice versa. Thus the rollers are adapted to pinch a thicker or thinner book.

Fixed on shaft $R^{14}$ at any convenient point thereon is a hand-lever, $R^{21}$, Figs. 2, 26, and pivoted to lever $R^{21}$ is the hook $R^{22}$, Figs. 2, 26, which latter (when hook $R^{18}$ is disengaged from the pin $R^{19}$ and lever $R^{21}$ is brought forward) engages the upper edge of the stationary piece or brace $A^4$ of the machine. This action of lever $R^{21}$ elevates the upper roller, R, and renders it inoperative for the time being.

I will now describe the mechanism for rotating the rollers R $R^2$.

Fixed on the main shaft B is a grooved cam, S, Fig. 2, with its hub operating a forked reciprocating rod, $S^2$ $S^3$, Figs. 1, 2, respectively, similar to cam $J^2$, hub $J^3$, and rod $J^4$ $J^5$, and similarly united together. The forward end of the reciprocating rod $S^2$ $S^3$ is pivoted to double lever $S^4$, Figs. 1, 2, 6, 27, fulcrumed at the inside of the frame A of the machine. On the forward end of this lever is an adjustable carriage, $S^5$, Figs. 1, 6, 27. This carriage is capable of sliding on lever $S^4$, and is set at any desired point along the length of the lever by means of the screw-rod $S^6$, Figs. 1, 6, 27, which latter is in turn locked by set-nut $S^7$, Fig. 27.

The screw-rod $S^6$ is prevented from longitudinal movement by having one end stepped in a recess, $S^8$, Fig. 27, in the lever $S^4$, near the fulcrum of the latter, and also by having the collar $S^9$, Fig. 27, engaging the plate $S^{10}$, Fig. 27, fixed to the end of lever $S^4$. The under side of lever $S^4$ is provided with a channel, $S^{12}$, Fig. 27, running longitudinally with the lever $S^4$. The carriage surrounds the lever $S^4$, and from the lower portion of said carriage rises the lug $S^{13}$, Fig. 27, fitting into channel $S^{12}$. The screw rod $S^6$ passes through an interiorly screw-threaded opening in this lug $S^{13}$ and engages the screw-thread thereof, so that by turning the screw-rod the carriage is moved on the lever $S^4$, as aforesaid. Suitably pivotally attached to the upper portion of the carriage $S^5$ are the chains $S^{14}$, Figs. 1, 6, 9, 10. These chains may be of various constructions; but the preferred kind of chain is shown in the drawings. Both of these chains pass up and against an idler, $S^{15}$, Figs. 1, 6, 9. One of these chains (the right-hand) then passes rearward under the pulley-sleeve $S^{16}$, Figs. 6, 9, of the lower roller, $R^2$, and then passes partially around the sleeve, and is then fastened to the latter. The other of these chains (the left-hand one) passes up in front of the idler $S^{15}$ and the pulley-sleeve $S^{17}$, Figs. 6, 9, 10, actuating the shaft of the upper roller, R, and then passes rearward and partially around said sleeve, and is then fastened to said sleeve. The chains are respectively wound far enough around their respective sleeves to enable the roller when rotated by its respective actuating-chain to rotate far enough to produce the desired effects hereinafter explained. The principal objects of providing a pulley-sleeve, as $S^{16}$, separate from and adjustable upon the shaft of its roller R or $R^2$ are, viz: first, when the rollers wear in one place, the rollers can be reset, so as to present a fresh surface to the action of the book; secondly, in case of breaking of the chain the pulley-sleeve can be reset and adapted to the reduced length of the chain; thirdly, ease of manufacture and of construction in the first instance is subserved.

The preferred means for causing the rollers R $R^2$ to rewind the chains $S^{14}$ and return to their first position consist of the strap $S^{18}$, Figs. 6 and 9, and weight $S^{19}$. (See Figs. 6 and 9.) The chains $S^{14}$ $S^{14}$ are preferably of metal, as they need to be so constructed as that they will not be in anywise elastic. Being non-elastic they will impart an even and decisive movement to the rounding-rollers. Such a movement is necessary to secure from the said rollers a perfect action in rounding the book and presenting the same to the jaws. One end of the strap $S^{18}$ is fastened to the shank of roller R and wound around said shank in a direction contrary to that in which the chain $S^{14}$ on the other end of said roller is wound. The strap $S^{18}$ now runs up and over the idle-pulley $S^{20}$, Figs. 1, 6, and 9, and thence passes down against idle-pulley $S^{21}$, Fig. 9, and thence under the pulley attached to weight $S^{19}$, and then upward over idle-pulley $S^{22}$, (see Fig. 9,) and thence forward, under, and up and around the shank of the roller $R^2$ in a direction contrary to that in which the chain $S^{14}$ on the other end of said roller is wound, and is there fastened to said shank. The strap secured at both ends forms a loop and upholds the weight $S^{19}$ by means of the pulley attached to the latter. The pulley enables the weight to shift along the strap and rise and fall with the latter, and at the same time exert a positive force to turn the rollers, which it will do whenever the chains are relaxed. The strap may be coiled any desired number of times upon itself on each roller-shank, and thus the power of the weight to turn the roller will be increased or diminished, according as the strap is rolled more or less on and around said roller-shank. The idle-pulleys $S^{20}$, $S^{21}$, $S^{22}$, and $S^{15}$ are suitably pivoted to the carriage T. This carriage T, Figs. 1, 6, 9, 12, 32, and 33, consists, in general, of a metal bridge whose ends are respectively supported and guided by the forward and top ends of the frame A $A^2$.

The means for adjusting the position of the said carriage and for setting it when adjusted and holding it steady are as follows, viz: In the forward end of the cross-brace $A^3$ (see Fig. 1) is a rod, $T^2$, (see Figs. 1, 6, and 8,) arranged to turn loosely therein. The rear end of this rod is screw-threaded and engages a female screw in a lug, $T^3$, (see Figs. 1 and 32,) fixed to the carriage T. The rotation of rod $T^2$ by means of the hand-wheel $T^4$ (see Figs. 1, 6, and 8) moves the carriage forward or rearward, as desired, and when the carriage is adjusted to the desired position the lock-nut $T^5$, Figs. 1 and 8, engaging a screw-thread on the rod in the vicinity of the cross-frame $A^3$, is turned and locks the rod $T^2$ from shifting. To further lock the ends of the carriage T and keep them steady I provide the clamping-screw $T^6$, (see Figs. 4 and 6,) located in the side of the machine. This screw passes through a slot, $T^7$, Fig. 4, in the side A of the frame, and is screwed into a lug, $T^8$, Fig. 6, fixed on the carriage and moving in contact with the inside of the frame A. On the outer end of the screw $T^6$ is a shoulder, which bears against the frame A at the sides of the slot. By tightening the screw the adjacent end of the carriage is rigidly held in position and the carriage prevented from oscillating on the center screw-rod, $T^2$. When the jaw-frame $F^{23}$ is at the extreme point of its forward movement, it is steadied by means of the abutting-screw $T^9$, Figs. 1 and 8, and the latter can be adjusted forward or rearward to a proper position by means of its screw-thread engaging a female screw in the rear end of center screw-rod, $T^2$. When adjusted, the abutting-screw is locked by the lock-nut $T^{10}$. (See Fig. 8.) The adjustment of this screw $T^9$ also enables the operator to enlarge or decrease the size of the joints of the book without changing any of the other adjustments of the machine.

To enable the operator to better guide the book between the rolls a tubular rest, $T^{12}$, (see Figs. 1, 6, and 32,) suitably attached to the carriage T, is provided. Curved rods $N^3$, Fig. 1, are provided to prevent the book from curling downward and striking the lower jaw. They are hinged at their forward ends to the carriage T. The rear ends of these rods respectively pass through the respective openings $N^4$ $N^4$, Figs. 1 and 19, in the oscillating frame $F^{23}$, immediately under the steel plate $J^{19}$ of the lower jaw. These stationary rods pass freely through the frame $F^{23}$ as the latter oscillates.

For enabling the operator to have on hand a supply of books within his ready reach I provide a table, $T^{13}$, Figs. 1 and 11, preferably removable. In the present illustrative instance it is constructed as follows: The table proper, $T^{13}$, is mounted on a metallic framework, $T^{14}$, (see Figs. 1 and 11,) provided with hooks $T^{15}$ $T^{15}$, (see Figs. 1 and 11,) these hooks respectively engaging the eyes in lugs $T^{16}$ $T^{16}$, (see Figs. 1, 2, 3, 4, 5, and 6,) fixed to the side $A^2$ of the frame. The table is prevented from swinging by the hook $T^{17}$ (see Figs. 1 and 11,) engaging the top of the side $A^2$ of the frame.

To prevent the book while being rounded from cocking up and striking the upper jaw I provide the spring N, Figs. 1, 6, and 7, fastened at one end of the cross bar $N^2$, Figs. 1, 6, and 7, connected to the sliding yokes $R^{17}$. The spring N passes from said bar $N^2$ upward, then rearward over the top of the roller R, then downward, terminating in a foot substantially on a level with the bottom of the roller R.

I will now describe the mechanism for operating the clutch and quickly stopping the machine.

$C^8$, as aforementioned, indicates the clutch-pinion running loosely on shaft $C^7$. The coupling member P, Figs. 4 and 29, of the clutch slides on the shaft $C^7$ in the direction of the length of the shaft, but is compelled to turn therewith by means of a feather, $P^2$, Figs. 3, 4, 5, and 29, and groove connection, the length of the feather and groove being parallel to the length of the shaft. On the boss of the coupling member P fits a ring, $P^3$, Fig. 29, provided with trunnions $P^4$ $P^4$, Figs. 4 and 29, and held to place on the boss by the collar $P^5$, Figs. 4 and 29. The boss turns loosely within the ring, as the latter does not revolve. The trunnions $P^4$ $P^4$ respectively engage the respective forks $P^6$, Figs. 4 and 29, of the lever $P^7$, Figs. 4 and 30. Said lever $P^7$ is fulcrumed at a suitable point, as $P^8$, Fig. 4, by a bracket rigidly attached to the frame of the machine.

To enable the operator to manipulate the lever $P^7$ by one continuous movement it is constructed as follows: I provide near the front of the machine a rest, P⁹, Figs. 4 and 30, upon which the forward end of the lever moves. The short hand-lever P¹⁰, Figs. 4 and 30, is connected to the forward end of the lever P⁷, as follows: A pivot at P¹², Figs. 4 and 30, makes a pivotal connection between said hand-lever P¹⁰ and lever P⁷. The pivoted end of the hand-lever P¹⁰ has an inclined plane, P¹³, Fig. 30, whose path is concentric with the pivot. At the end of this inclined plane is the stop P¹⁵, Fig. 30. Resting on the incline plane P¹³ is the shoulder P¹⁶, Figs. 4 and 30, of the adjustable vertically-moving stop-pin P¹⁷, Figs. 4 and 30. This stop-pin P¹⁷ is upheld and guided by passing through flange P¹⁸, Figs. 4 and 30, attached to the forward end of lever P⁷. The lower end of the stop-pin passes through the end of the lever P⁷, and is also guided and supported by the lever. When the stop-pin is at the lower end of the inclined plane P¹³, it drops into opening P¹⁹, Fig. 30, in the bracket P⁹, or past the end of the latter when the said opening is omitted, and the bracket is thereby utilized as a stop. Supposing the coupling members P and C⁸ to be interlocked, then to disengage them the following movements take place: The hand-lever P¹⁰ is drawn toward the operator. This operation turns the said lever P¹⁰ and forces the stop-pin P¹⁷ up the inclined plane P¹³. This movement disengages the stop-pin P¹⁷ from engagement with bracket P⁹ by lifting the foot of said pin above and away from said bracket. The operator continues to draw the lever P¹⁰ toward himself, and the stop P¹⁴ now strikes pin P¹⁷ and converts the hand-lever P¹⁰ and lever P⁷ (so long as the operator continues to draw the lever P¹⁰ toward himself) into one rigid lever, which (as the operator continues to draw the hand-lever P¹⁰ toward himself) operates to disengage the coupling members P and C⁸.

In order to engage the coupling members P and C⁸ the operator pushes the short hand-lever P¹⁰ away from him, and the said hand-lever swings until the shoulder P¹⁵, or equivalent stop, reaches the stop-pin P¹⁷, and the hand-lever P¹⁰ and lever P⁷ are now converted into a rigid lever; and as the operator continues to push the hand-lever from himself the coupling members P and C⁸ are made to engage one another, and the stop-pin P¹⁷ drops and engages the bracket or stop P⁹, and the lever P⁷ is locked in position.

Among the advantages of the clutch and of its application at the point shown is this: In case of any stoppage of any part of the machinery or any obstruction thereof the operator is enabled to instantly stop the operating mechanism and get rid of the momentum of the fly-wheel, as the latter, by the action of the clutch, is entirely cut off from all connection with the operating mechanism.

I will now describe, in general, the mode in which my machine operates.

The rounding-rollers having been adjusted to properly grasp a book of a certain thickness, the book is inserted between the said rollers, the back of the book resting against guides L¹⁶, which latter have also been properly adjusted. The upper rounding-roller, R, now descends and impinges or presses on the book, and the latter is compressed between rounding-rollers R and R². The guides L¹⁶ now rise out of the way. The rounding-rollers R and R² now perform that part of a revolution which they have been adjusted to perform, so that they rotate enough to throw the book rearward far enough to pass the book between the jaws and cause the back of the book to project sufficiently far beyond the rear edge of the jaws to enable the backing device to form on the book the proper-sized joint. While the book is passing rearward, owing to the action of the rollers in rounding, there is a strain brought on the back of the book, which frequently causes the back of the book to curl up or down.

Any tendency of the book to curl up is prevented by spring N, and any tendency of the book to curl down is prevented by the rods N³ N³. The upper jaw, F³⁷, now descends, and as it descends the heels of the springs F⁴³ F⁴³ first strike the upper side of the book, and as they (the springs) are pressed upon their action is such as to smooth out all buckling or wrinkling of the book previously caused by the action of the rounding-rollers. The upper jaw, F³⁷, still descends, and the book is now firmly grasped between the jaws F³⁷ and J, and at this moment the rounding-roller R rises, and the rounding-rollers release their grasp of the book. The jaws now swing rearward and bring the back of the book in contact with the vibrating backing-plate D²⁵. The pressure which this plate D²⁵ exerts upon the back of the book is regulated by the screws D⁴². The pressure which this plate D²⁵ exerts upon the joints of the book is regulated by the nuts D³¹ D³¹ D³¹ D³¹. The book being backed, the jaws now move toward the operator, at the same time releasing their grasp on the book. As the book moves forward toward the operator it impinges against a second book already placed between the rounding-rollers by the operator, and is shoved out rearward from between the jaws by this second book, the latter taking the place between the jaws formerly occupied by the first book. This first book is now removed by the operator.

Ordinarily, the mechanism heretofore described for actuating the toggles J¹⁶ J¹⁷ should be constructed so as to yield both on the shove and the pull of the rod J¹⁵, and to provide for this necessity I have constructed the rod J¹⁵ as shown in Fig. 34, to wit: One portion, J²⁰, of the rod is made as a sleeve, and the other portion is a rod, J²¹, provided with shoulders, flanges, or equivalent stops J²². Each end portion of the rod J²¹ carries its spring J²³, and each spring J²³ is compressed between its adjacent collar, J²⁴, sliding on rod J²¹, and the adjacent stop, $J^{25}$. Each spring keeps its collar $J^{24}$ against the adjacent shoulder or stop, $J^{22}$, of the rod $J^{21}$.

The resilient or elastic force or power of the springs $J^{23}$ $J^{23}$ is regulated, preferably, by making the stops $J^{25}$ adjustable on the rod $J^{21}$ by means of a screw-connection therewith. Whenever the rod $J^{21}$ is subjected to a thrust or pull greater than the springs $J^{23}$ are set to resist, the appropriate spring $J^{23}$ will yield and save the mechanism from injury. Whenever a book is accidentally displaced when grasped by the jaws, the rod $J^{21}$ must yield in its thrust, and when the jaws are returning toward the rounding-rollers, and a book should be misplaced between the said rollers or so turn up as to strike the front side or sides of the jaws and not enter between them, the rod $J^{21}$ must yield in its pull.

Ordinarily, the mechanism for vertically reciprocating the cross-bar K, employed to brace the jaws $F^{37}$ and J while the book is being backed, should be constructed to yield on the pull of the rod $K^8$. To provide for this necessity I have combined with the cross-bar K and each of the rods $K^8$ the following devices: Instead of pivoting the upper end of rod $K^8$ directly to the cross-bar K, I pivot said end of the rod $K^8$ to the lower end of the rod $K^{12}$. (See Figs. 35 and 36.) The latter is provided with shoulder $K^{13}$ below the cross-bar K. This rod $K^{12}$ slides in the end portion of the cross-bar K, preferably through an eye of the latter, (see Figs. 35 and 36,) and projects above the said cross-bar. On this portion of the rod $K^{12}$ which projects above said cross bar K is a spring, $K^{14}$, which is compressed between the said cross-bar and a stop, $K^{15}$, at the upper end of said rod. The resilient power or push of the spring $K^{14}$ may be regulated by rendering the stop $K^{15}$ adjustable, preferably by means of uniting the stop $K^{15}$ to the rod $K^{12}$ by a screw-threaded union. While the jaws are moving toward the backing-plate, should there happen to be an obstruction between them and the said backing-plate, the jaws are prevented from making their full movement in that direction and are directly in the way of the cross-bar K, and obstruct the descent of the latter as drawn down by rod $K^8$. The spring $K^{14}$ now yields and allows the rod $K^8$ to carry out its full downward movement without injury to the mechanism.

Instead of the backing-plate $D^{25}$, a cam-shaped plate or a roller or segment of a roller may be employed, and may be substituted as an equivalent element for the backing-plate in the following claims, wherein the backing-plate appears as an element, and this may be done without altering the features of invention covered by such claims.

In relation to the cams heretofore mentioned it may be remarked that the groove in each cam is so shaped as to produce the proper movement, and the cams are so placed on the main shaft, as B, as to make these movements at their proper time.

While the various features of my invention are preferably employed together, one or more of said features may be employed without the remainder, and, in so far as applicable, one or more of said features may be employed in connection with mechanism for rounding and backing books, or for both rounding and backing them, other than that herein specifically shown and described.

What I claim as new and of my invention, and desire to secure by Letters Patent, is—

1. The compound yielding rod $F^8$ $F^9$ $F^{12}$, in combination with the toggle F $F^2$, lever $F^{14}$ $F^{17}$, rod $F^{18}$, toggle $F^{20}$ $F^{21}$, and jaws $F^{37}$ and J, substantially as and for the purposes set forth.

2. The combination of the frame $F^{23}$, pivoted at $F^{24}$, jaws $F^{37}$ and J, toggle $F^{20}$ $F^{21}$, arm $F^{19}$, connected rigidly to one of the toggle-arms at an angle thereto, rod $F^{18}$, levers $F^{17}$ $F^{14}$, and means for operating the latter, substantially as set forth.

3. The combination of the lower jaw, J, and upper jaw, $F^{37}$, rods $F^{29}$, supporting the latter, yoke-piece $F^{26}$, nuts $F^{28}$, toothed wheels $F^{31}$, and worms $F^{32}$, shaft $F^{33}$, hand-wheel $F^{36}$, and frame $F^{23}$, substantially as set forth.

4. The combination, with the upper jaw, $F^{37}$, of the springs $F^{43}$, connected thereto and bent under the said jaw, substantially as set forth.

5. The upper jaw, $F^{37}$, provided with recesses $F^{45}$, and the springs $F^{43}$, respectively entering said recesses, as and for the purposes set forth.

6. The upper jaw, $F^{37}$, provided with recesses $F^{45}$ and the springs $F^{43}$, and straps $F^{44}$ $F^{44}$, through which the shanks of the springs respectively slide, substantially as and for the purposes set forth.

7. The combination of the rounding-rollers R $R^2$, spring N, bar $N^2$, and the yokes $R^{17}$ $R^{17}$, substantially as set forth.

8. The combination of a backing device, $D^{25}$, arms $D^{17}$ $D^{17}$, sliding carriage $D^{39}$, screw-threaded rods $D^{42}$, and lugs $D^{46}$, substantially as set forth.

9. The combination of the sliding carriage $D^{39}$, screw-threaded rod $D^{42}$, provided with shoulders $D^{40}$ $D^{44}$, cap $D^{45}$, set-screw $D^{48}$, and lug $D^{46}$, arms $D^{17}$, and oscillating backing-plate $D^{25}$, substantially as set forth.

10. In a machine for rounding and backing books, the combination of the lever $P^7$, stop-pin $P^{17}$, stop-bracket $P^9$, hand-lever $P^{10}$, provided with incline plane $P^{13}$ and stop $P^{14}$ $P^{15}$, and clutch member P, substantially as set set forth.

11. The combination of lever $D^3$, rigidly attached to collar $D^{12}$, provided with lugs $D^{10}$ $D^{10}$, lug $D^9$, rigidly connected to sleeve $D^4$, bolt $D^{13}$, connecting lug $D^9$ to lugs $D^{10}$ $D^{10}$, lock-nuts $D^{14}$ $D^{14}$ on said bolt $D^{13}$, sleeve $D^4$, quadrants $D^7$ $D^7$ $D^{15}$, frame $D^{18}$, cross-bar $D^{23}$, and backing-plate $D^{25}$, substantially as and for the purposes set forth.

12. In the mechanism for operating the backing-plate, the combination of lever $D^3$, sleeve $D^4$, to which quadrants $D^7$ $D^7$ are rigidly attached, shaft $D^8$, sliding carriages $D^{39}$, quadrants $D^{15}$ $D^{15}$, frame $D^{18}$, cross-bar $D^{28}$, suitably supported, and the backing-plate $D^{25}$, connected to the cross-bar $D^{28}$, substantially as set forth.

13. The combination of the main shaft B, cam $K^2$, adjustable rod $K^3$ $K^4$, lever $K^5$, shaft $K^6$, levers $K^7$ $K^7$, rods $K^8$ $K^8$, cross-bar K, bars $K^{10}$ $K^{10}$, and jaw $F^{37}$, substantially as set forth.

14. The combination of the reciprocating rods $K^8$ $K^8$, pivoted rods $K^{12}$ $K^{12}$, cross-bar K, through which said rods $K^{12}$ pass, springs $K^{14}$, stops $K^{15}$, bars $K^{10}$ $K^{10}$, and jaw $F^{37}$, substantially as set forth.

15. The combination of the cross-bar K, bars $K^{10}$ $K^{10}$, and jaws $F^{37}$ and J, substantially as set forth.

16. The mechanism for elevating the upper rounding-roller out of working position, consisting of rods $R^{16}$ $R^{16}$, levers $R^{15}$ $R^{15}$, shaft $R^{14}$, hand-lever $R^{21}$, hook $R^{22}$, and stop-piece $A^4$, in combination with said upper rounding-roller, R, substantially as set forth.

17. The mechanism for adjusting the distance of the rounding-rollers from one another, consisting of the reciprocating elastic compound screw-rod $R^7$ $R^6$ $R^5$, spring $R^{10}$, nut $R^9$, slide $R^8$, and stop $R^{12}$, in combination with the rounding-rollers and connections, substantially as set forth.

18. The reciprocating compound screw-rod $R^5$ $R^6$ $R^7$, provided with a notch in part $R^7$, rod $R^{18}$, hand or thumb wheel $R^{20}$, pin $R^{19}$, and lever $R^{13}$, in combination with the rounding-rollers R $R^2$ and their connecting mechanism, substantially as and for the purposes set forth.

19. The combination of main shaft B, cam $R^3$, reciprocating rod $R^4$ $R^5$, yielding rod $R^5$ $R^6$, lever $R^{13}$, shaft $R^{14}$, levers $R^{15}$ $R^{15}$, rods $R^{16}$ $R^{16}$, yokes $R^{17}$ $R^{17}$, and rounding roller R, substantially as set forth.

20. In the mechanism for holding the center on which the backing-plate oscillates, the center pins, $D^{16}$ $D^{16}$, supported by arms $D^{17}$ $D^{17}$, supporting-rods $D^{27}$ $D^{27}$, cross-bar $D^{28}$, nuts $D^{31}$, and uprights $D^{30}$ $D^{30}$, in combination with backing-plate $D^{25}$, substantially as and for the purposes set forth.

21. The center pins, $D^{16}$ $D^{16}$, rods $D^{27}$ $D^{27}$, cross-bar $D^{28}$, threaded upright bars $D^{30}$ $D^{30}$, and nuts $D^{31}$ $D^{31}$ $D^{31}$ $D^{31}$, in combination with backing-plate $D^{25}$, substantially as set forth.

22. The combination of springs $D^{37}$, collars $D^{32}$, each provided with a feather, $D^{35}$, and a lug, $D^{34}$, nuts $D^{31}$, each provided with grooves $D^{33}$, screw-threaded upright bars $D^{30}$, each provided with a groove or slot, $D^{36}$, cross-bar $D^{28}$, and backing-plate $D^{25}$, substantially as described.

23. The combination of strap $S^{18}$, weight $S^{19}$, rounding-rollers R $R^2$, and metallic chains $S^{14}$ $S^{14}$, substantially as set forth.

24. The combination of the oscillating piece $L^{13}$, arm L, provided with guides $L^{16}$ $L^{16}$, and carriage T, as and for the purposes set forth.

25. The combination of the book-guides, oscillating piece $L^{13}$, base-stop $L^{18}$, stop-piece $L^{20}$, and spring $L^{19}$, substantially as set forth.

26. The combination of the oscillating piece $L^{13}$, guide carrying arm L, pivoted to piece $L^{13}$ and provided with stop $L^{17}$, and reciprocating rod $L^8$, substantially as described, and for the purposes set forth.

EDWIN CRAWLEY.

Witnesses:
JNO. W. STREHLI,
O. M. HILL.